US012047751B2

(12) United States Patent
Kanemaru

(10) Patent No.: US 12,047,751 B2
(45) **Date of Patent: *Jul. 23, 2024**

(54) METHOD FOR DETERMINING MICROPHONE POSITION AND MICROPHONE SYSTEM

(71) Applicant: Audio-Technica Corporation, Tokyo (JP)

(72) Inventor: Shinken Kanemaru, Tokyo (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,634

(22) Filed: Dec. 5, 2022

(65) Prior Publication Data

US 2023/0125643 A1 Apr. 27, 2023

Related U.S. Application Data

(63) Continuation of application No. 16/996,326, filed on Aug. 18, 2020, now Pat. No. 11,553,294.

(30) Foreign Application Priority Data

Aug. 19, 2019 (JP) ................................ 2019-149812

(51) Int. Cl.
*H04R 3/00* (2006.01)
*H04R 1/40* (2006.01)
*H04R 29/00* (2006.01)

(52) U.S. Cl.
CPC .......... *H04R 29/005* (2013.01); *H04R 1/406* (2013.01); *H04R 3/005* (2013.01)

(58) Field of Classification Search
CPC ............... H04R 3/005; H04R 2430/23; H04R 2201/40; H04R 25/40; H04R 1/32; H04R 1/20

(Continued)

(56) References Cited

U.S. PATENT DOCUMENTS 6,205,224 B1 * 3/2001 Underbrink ........... H04R 1/403 343/893
9,930,448 B1 3/2018 Chen et al.

(Continued)

FOREIGN PATENT DOCUMENTS

JP H10293168 A 11/1994

*Primary Examiner* — Disler Paul
(74) *Attorney, Agent, or Firm* — WC&F IP

(57) ABSTRACT

A method for determining microphone position is a method for determining positions of a plurality of microphones in a microphone array having the plurality of microphones arranged in a plurality of concentric circles. The method for determining microphone position includes a constraint condition acquiring step of acquiring constraint conditions including the maximum number of the plurality of microphones; and a selecting step of selecting, from among a plurality of combinations of (i) the number of microphones included in each of the plurality of concentric circles and (ii) the radius of each of the plurality of concentric circles, a combination indicating directional characteristics with the smallest difference from a target value of the directional characteristics of the microphone array, where the plurality of combinations satisfy the constraint conditions.

6 Claims, 9 Drawing Sheets

(58) Field of Classification Search
USPC ........................................ 381/91–92, 122, 26
See application file for complete search history.

(56) References Cited

U.S. PATENT DOCUMENTS

| | | | | |
|---|---|---|---|---|
| 10,506,337 | B2 * | 12/2019 | Chen ...................... | H04R 3/005 |
| 10,839,822 | B2 * | 11/2020 | Chen ...................... | G10L 25/30 |
| 11,089,402 | B2 * | 8/2021 | Sabin ..................... | H04R 3/005 |

* cited by examiner

METHOD FOR DETERMINING MICROPHONE POSITION AND MICROPHONE SYSTEM

CROSS-REFERENCE TO RELATED APPLICATIONS

The present application claims priority to Japanese Patent Application Number 2019-149812, filed on Aug. 19, 2019. The contents of this application are incorporated herein by reference in their entirety.

BACKGROUND OF THE INVENTION

Technical Field

The present invention relates to a method for determining positions of a plurality of microphones in a microphone array including the plurality of microphones, and a microphone system including the microphone array.

Conventionally, a microphone array installed in a conference room or the like is known. In the conventional microphone array disclosed in U.S. Pat. No. 9,565,493, a plurality of microphones are provided on a plurality of concentric circles.

An arrangement of the microphones in the conventional microphone array is determined by the experience and intuition of a designer. Therefore, a difference between a main lobe and a side lobe in directional characteristics of the microphone array is insufficient, and it has been required to improve a directivity.

BRIEF SUMMARY OF THE INVENTION

This invention focuses on this point, and an object of the invention is to improve the directivity of the microphone array.

A method for determining microphone position according to a first aspect of the present invention is a method for determining positions of a plurality of microphones in a microphone array having the plurality of microphones arranged in a plurality of concentric circles. The method for determining microphone position includes a constraint condition acquiring step of acquiring constraint conditions including the maximum number of the plurality of microphones; and a selecting step of selecting, from among a plurality of combinations of (i) the number of microphones included in each of the plurality of concentric circles and (ii) the radius of each of the plurality of concentric circles, a combination indicating directional characteristics with the smallest difference from a target value of the directional characteristics of the microphone array, where the plurality of combinations satisfy the constraint conditions.

A microphone system according to a second aspect of the present invention is a microphone array having a plurality of microphones arranged on a plurality of concentric circles, wherein a variation amount of a difference between the radii of two concentric circles adjacent to each other among the plurality of concentric circles does not increase monotonically according to a distance from the center position of the plurality of concentric circles, and an attenuation amount of a side lobe relative to a main lobe in the directional characteristics is equal to or greater than 10 dB.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Outline of a Microphone System S]

Figure 1A:
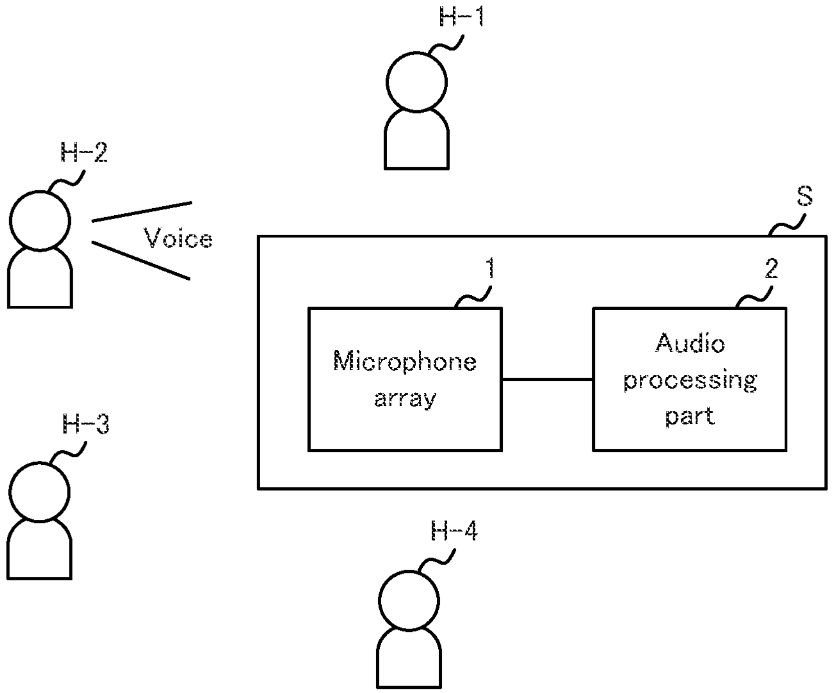
FIGS. 1A and 1B each illustrate an outline of a microphone system.
Figure 1B:
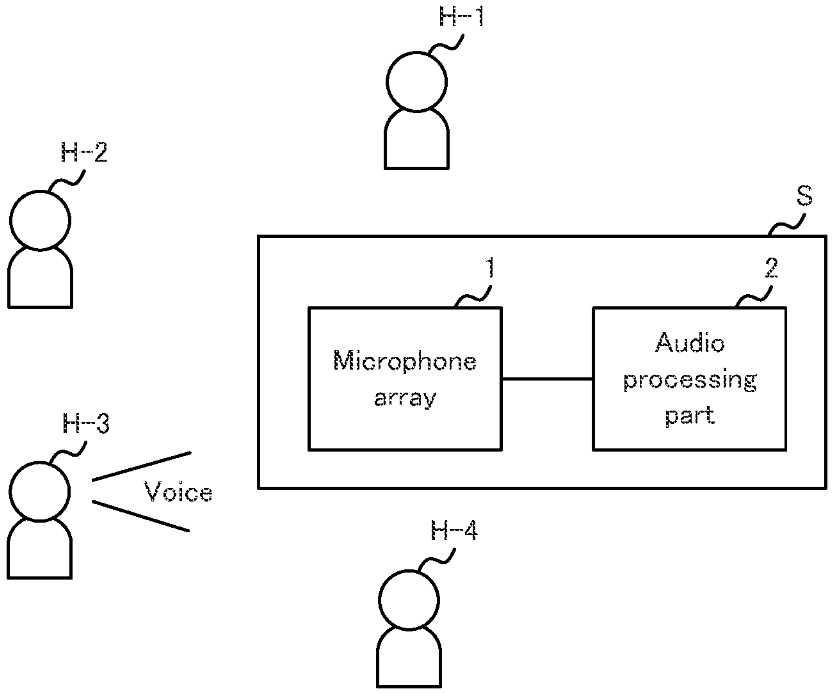
Figure 2:
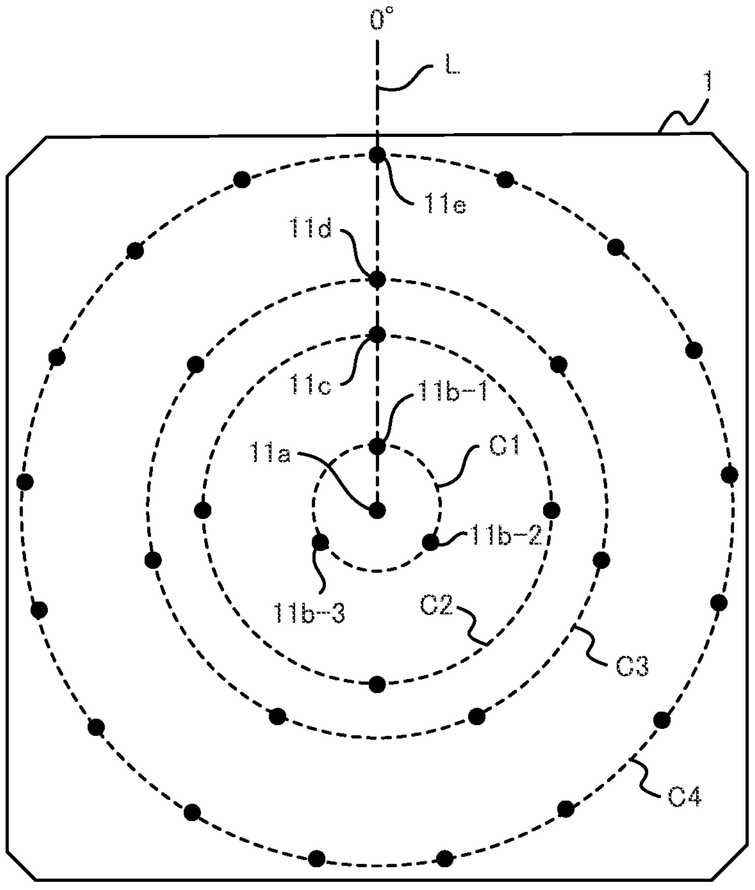
FIG. 2 shows a configuration of a microphone array.

FIGS. 1A and 1B each illustrate an outline of a microphone system S. FIG. 2 shows a configuration of a microphone array 1. The microphone system S includes the microphone array 1 and an audio processing part 2 and is a system for collecting voices generated by a plurality of speakers H (speakers H-1 to H-4 in FIGS. 1A and 1B) in a space such as a conference room or a hall. The microphone system S does not need to include the audio processing part 2, and may be connected to a computer that performs audio processing.

As shown by black circles in FIG. 2, the microphone array 1 includes a plurality of microphones 11 and is installed on a ceiling, a wall surface, or a floor surface of the space where the speakers H stay. The microphone array 1 inputs, to the audio processing part 2, a plurality of sound signals based on the voices input to the plurality of microphones 11.

The audio processing part 2 is a device that processes the sound signals output from the microphone array 1 (that is, the plurality of sound signals output from the plurality of microphones 11). The audio processing part 2 specifies a direction to a position where a speaker H who has spoken (i.e., a sound source) is located, by analyzing the sound signals input from the microphone array 1. Further, the audio processing part 2 executes a beamforming process by adjusting weight coefficients of the plurality of sound signals corresponding to the plurality of microphones 11 on the basis of the direction toward a specified speaker H and makes sensitivity to the voice generated by this speaker H higher than sensitivity to sounds coming from directions other than the direction toward this speaker H.

FIG. 1A shows a state where the speaker H-2 is speaking. FIG. 1B shows a state where the speaker H-3 is speaking. In the state shown in FIG. 1A, the audio processing part 2 performs the beamforming process such that a main lobe in directional characteristics of the microphone array 1 is directed toward the speaker H-2. In this case, the audio processing part 2 synthesizes the plurality of sound signals, for example, by assigning a greater weight to the sound signal output from the microphone 11 at a position near the speaker H-2 than to sound signals output from the other microphones 11. In the state shown in FIG. 1B, the audio processing part 2 performs the beamforming process such that the main lobe in the directional characteristics of the microphone array 1 is directed toward the speaker H-3. In this case, the audio processing part 2 synthesizes the plurality of sound signals, for example, by assigning a greater weight to the sound signal output from the microphone 11 at a position near the speaker H-3 than to sound signals output from the other microphones 11.

In the microphone array 1, the plurality of the microphones 11 are arranged such that a difference in the directional characteristics between the main lobe and a side lobe is equal to or greater than 10 dB due to the audio processing part 2 performing the beamforming process. Next, a configuration of the microphone array 1 and a method for determining an arrangement of the plurality of the microphones 11 will be described in detail.

[Configuration of the Microphone Array 1]

As shown with the black circles in FIG. 2, the microphone array 1 includes the plurality of microphones 11 that are arranged on a plurality of (for example, four or more) concentric circles. In the microphone array 1, the plurality of the microphones 11 are provided for each of four concentric circles: C1, C2, C3, and C4. The concentric circle C1 is the innermost concentric circle, and three microphones 11 are provided on the concentric circle C1. Those three microphones 11*b* (11*b*-1, 11*b*-2, and 11*b*-3) provided on the concentric circle C1 function as (i) sound source localization microphones 11 for specifying the directions to positions where speakers H who are sound sources are located and (ii) beamforming microphones 11 for collecting the voices generated by the speakers H.

The concentric circle C2 is the second inner concentric circle, and four microphones 11*c* are arranged on the concentric circle C2. The concentric circle C3 is the third inner concentric circle, and seven microphones 11*d* are arranged on the concentric circle C3. The concentric circle C4 is the outermost concentric circle. On the concentric circle C4, seventeen microphones 11*e* are arranged. The microphones 11 arranged on the concentric circles C2, C3 and C4 function as the beamforming microphones 11. It should be noted that, in FIG. 2, among the plurality of microphones 11*c*, 11*d*, and 11*e*, the reference numerals are denoted only for the microphones 11 arranged on a straight line L.

As will be described in detail below, the radii of the four concentric circles C1, C2, C3 and C4, as well as the number and positions of the microphones 11 included in each concentric circle, are determined by searching for optimal directional characteristics. As a result, a variation amount of a difference between the radii of two concentric circles adjacent to each other among the four concentric circles C1, C2, C3, and C4 is determined such that the variation amount does not increase monotonically according to a distance from the center position of the plurality of concentric circles.

Specifically, in the microphone array 1 shown in FIG. 2, the radius of the concentric circle C1 is 0.03856 [m], the radius of the concentric circle C2 is 0.10660 [m], the radius of the concentric circle C3 is 0.14024 [m], and the radius of the concentric circle C4 is 0.21500 [m]. A difference between the radii of the concentric circles C1 and C2 is 0.06804 [m], a difference between the radii of the concentric circles C2 and C3 is 0.03364 [m], and a difference between the radii of the concentric circles C3 and C4 is 0.07476 [m], and these differences do not increase monotonically according to the distance from the central position of the concentric circles. Also, an attenuation amount of the side lobe with respect to the main lobe in the directional characteristics of the microphone array 1 is −14.8 dB, and sufficient directivity is realized. The microphone array 1 has such good directional characteristics because the arrangement of the plurality of microphones 11 is determined by using an algorithm for searching for an optimal arrangement of the plurality of microphones 11, as will be described in detail below.

Among the plurality of microphones 11 included in the microphone array 1, both (i) a microphone 11*a* arranged at the central position of the plurality of concentric circles and (ii) three microphones 11*b* (11*b*-1, 11*b*-2, and 11*b*-3) provided at uniform intervals on the innermost concentric circle C1, which is the closest to the central position, function as a plurality of sound source localization microphones 11 used for specifying positions of the sound sources. The other microphones 11 included in the microphone array 1 function as a plurality of beamforming microphones 11 used for collecting sounds generated from the sound sources whose positions are specified by the sound source localization microphones 11. The microphone 11*a* and the microphones 11*b*-1 to 11*b*-3 may further function as the beamforming microphones 11. In other words, the microphone 11*a* and the microphones 11*b*-1 to 11*b*-3 may be used for two purposes: for the sound source localization and for beamforming.

A distance between two sound source localization microphones 11 adjacent to each other among the plurality of microphones 11 that function as the sound source localization microphones 11 is less than or equal to half of the minimum wavelength of a sound in a frequency band used to specify the direction to the position where the speaker H, who is the sound source, is located. Since aliasing does not occur when the distance between the two sound source localization microphones 11 is set in this manner, the accuracy of estimating the direction toward the speaker H improves.

When a frequency range that includes main frequency components of the voice of an assumed speaker H is equal to or above 500 Hz and equal to or below 4000 Hz, a distance D between the two sound source localization microphones 11 adjacent to each other is preferably 42.5 mm or less, since the wavelength of a sound with a frequency of 4000 Hz is 85 mm. When the frequency range that includes the main frequency components of the voice of the assumed speaker H is equal to or above 500 Hz and equal to or below 5000 Hz, the distance D is preferably 34 mm or less since the wavelength of a sound with a frequency of 5000 Hz is 68 mm. It should be noted that if the distance D is too small, a difference in sounds entering each of the sound source localization microphones 11 becomes too small, and for this reason, the distance D is preferably, for example, 30 mm or more and 40 mm or less.

Also, some of the microphones 11 are provided at a plurality of intersections where at least one straight line L passing through the center of the plurality of concentric circles C1, C2, C3, and C4 intersects with the respective concentric circles C1, C2, C3, and C4. In an example shown in FIG. 2, the microphones 11*a*, 11*b*-1, 11*c*, 11*d*, and 11*e* are arranged on the same straight line L. That is, one of the microphones 11 arranged on the concentric circle C1, one of the microphones 11 arranged on the concentric circle C2, one of the microphones 11 arranged on the concentric circle C3, and one of the microphones 11 arranged on the concentric circle C4 are arranged on the same straight line L as one of the microphones 11 arranged on the other concentric circles.

Because the microphone array 1 is configured in this manner, the accuracy of performing audio processing to enhance the directivity of the direction toward the speaker H is improved, and the load of the audio processing is reduced. Also, since a positional relationship of the plurality of microphones 11 becomes clearer, the accuracy of specifying the direction toward the speaker H is improved.

[Configuration of the Audio Processing Part 2]

Figure 3:
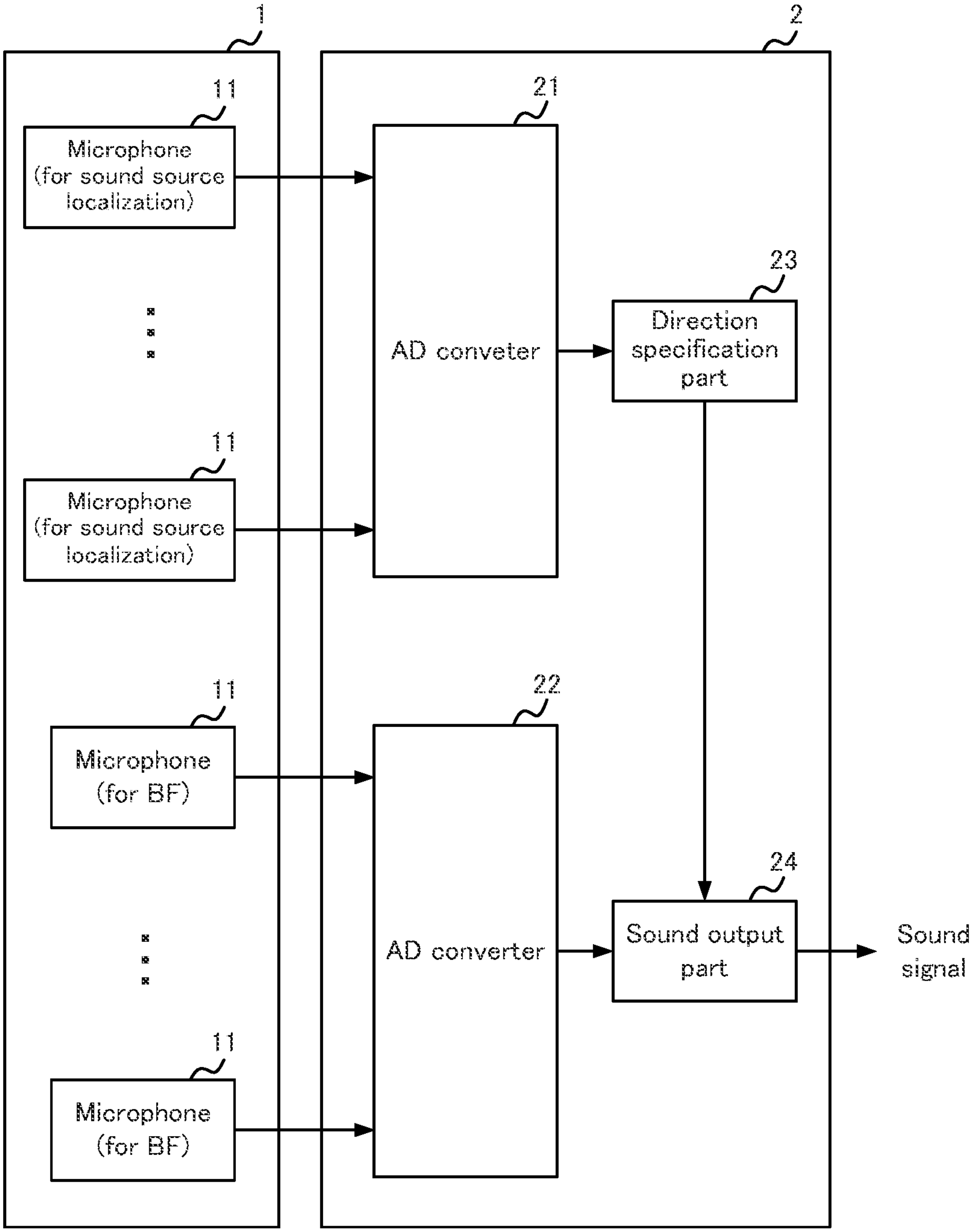
FIG. 3 shows a configuration of an audio processing part.

FIG. 3 shows a configuration of the audio processing part 2. The audio processing part 2 includes an AD converter 21, an AD converter 22, a direction specification part 23, and a sound output part 24.

The AD converter 21 converts a plurality of sound signals based on sounds that entered the plurality of sound source localization microphones 11 into a plurality of pieces of sound source localization digital data. The AD converter 21 inputs the converted sound source localization digital data to the direction specification part 23. The AD converter 22 converts a plurality of sound signals based on sounds that enter the plurality of beamforming microphones 11 ("BF" in FIG. 3) into a plurality of pieces of beamforming digital data. The AD converter 22 inputs the converted beamforming digital data to the sound output part 24. The AD converter 21 and the AD converter 22 may be configured by a plurality of devices or may be configured by a single device.

The direction specification part 23 specifies the direction to the position where the speaker H who is the sound source is located, on the basis of the plurality of sound signals input from the plurality of sound source localization microphones 11. Specifically, the direction specification part 23 specifies the direction toward the speaker H on the basis of a plurality of pieces of sound source localization digital data input from the AD converter 21. The direction specification part 23 specifies the direction toward the speaker H, for example, on the basis of a relationship between the loudness of sounds which each of the plurality of sound source localization digital data indicates. The direction specification part 23 notifies the sound output part 24 of the direction toward the specified speaker H.

The sound output part 24 outputs sounds synthesized by weighting each of the plurality of sounds input to the beamforming microphones 11 on the basis of the direction toward the speaker H, specified by the direction specification part 23. Specifically, the sound output part 24 outputs the synthesized sounds by generating a plurality of multiplied values by multiplying a weight coefficient, which is determined on the basis of a direction to a position where the speaker H who is speaking is located, to each of the plurality of beamforming digital data corresponding to each microphone 11, and by adding the generated plurality of multiplied values. For example, an absolute value of a weight coefficient for the microphone 11 at a position corresponding to the direction toward the speaker H is set to a value greater than an absolute value of a weight coefficient for a microphone 11 at the other position. Due to the direction specification part 23 and the sound output part 24 operating in this manner, reproducibility of the sounds generated by the speakers H is improved regardless of the directions to the positions where the speakers H are located.

Since the directional characteristics of the microphone array 1 are different according to the arrangement of the plurality of microphones 11, the quality of the sounds synthesized by the sound output part 24 is affected by the arrangement of the plurality of microphones 11. Next, a method for determining the arrangement of the plurality of microphones 11 for improving the quality of the sounds synthesized by the sound output part 24 will be described in detail.

[Outline of the Method for Determining the Arrangement of the Plurality of Microphones 11]

Figure 4:
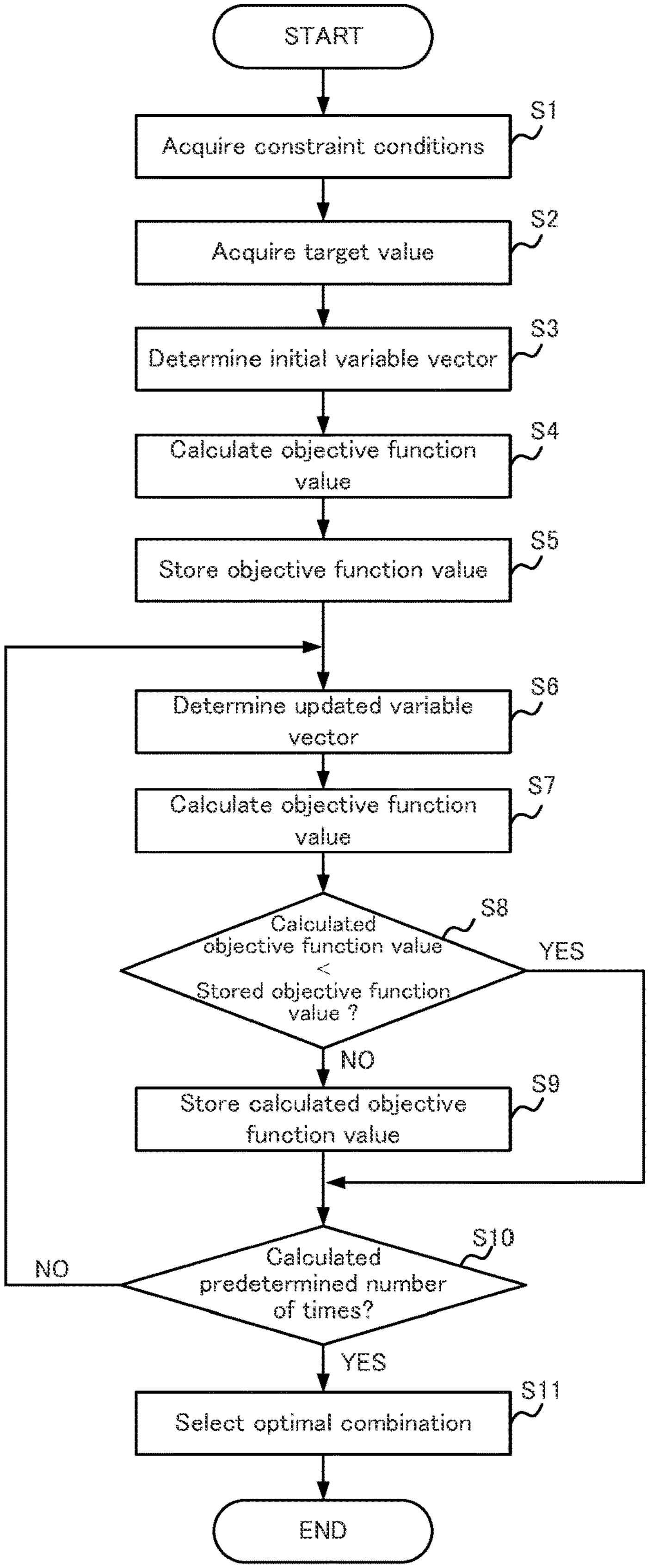
FIG. 4 is a flowchart showing an outline of a method for determining an arrangement of a plurality of microphones.

FIG. 4 is a flowchart showing an outline of a method for determining the arrangement of the plurality of microphones 11. As an example, an arrangement search device has a computer and determines the arrangement of the plurality of microphones 11 by a method for determining microphone position shown in the flowchart of FIG. 4 by executing programs. The arrangement search device determines the optimal arrangement for the plurality of microphones 11 when a sound source is in a particular direction, by executing the method shown in the flowchart of FIG. 4. The arrangement search device changes a direction of the sound source (i.e., a direction to a position where the sound source is located) to a plurality of different directions in order to determine the optimal arrangement of the plurality of microphones 11 for the respective directions. The arrangement search device determines the arrangement of the plurality of microphones 11 that is as suitable as possible for each of the directions in which the plurality of sound sources are located, for example, by using the least squares method.

Hereinafter, the process in which the arrangement search device determines the arrangement of the plurality of microphones 11 will be described with reference to FIG. 4. The arrangement search device determines the arrangement of the plurality of microphones 11 using, for example, a differential evolution (DE) method, which is a differential evolution algorithm, or a JADE method which is an improved DE method.

In order to determine the arrangement of the plurality of microphones 11, the arrangement search device first acquires constraint conditions (step S1). For example, the arrangement search device displays a screen for inputting the constraint conditions on a display, and acquires the constraint conditions input on the screen.

The arrangement search device acquires, for example, the maximum number of the plurality of microphones 11, as one of the constraint conditions. The arrangement search device may acquire the number of the sound source localization microphones 11 and the radius of the outermost concentric circle of the plurality of concentric circles, as one of the constraint conditions. Due to the arrangement search device acquiring these constraint conditions, the time for determining the arrangement of a plurality of microphones 11 that satisfy the size and cost requirements of the microphone array 1 can be reduced. The arrangement search device may acquire the number of microphones 11 included in each of the plurality of concentric circles to be three or more, as one of the constraint conditions. By having three or more microphones 11 in one concentric circle, it is possible to reduce the variability of the directional characteristics due to the direction of the sound source.

Subsequently, the arrangement search device acquires a target value of the directional characteristics of the microphone array 1 (step S2). The directional characteristics of the microphone array 1 are represented by a value corresponding to a difference between (i) the magnitude of a main lobe of sensitivity to the input sound signals and (ii) the magnitude of a side lobe of the sensitivity to the input sound signals. For example, the directional characteristics of the microphone array 1 are expressed as an attenuation amount of the side lobe relative to the main lobe when a predetermined sound is input to the microphone array 1. For example, the arrangement search device displays a screen for inputting the target value on the display, and acquires the target value inputted on the screen.

Next, the arrangement search device determines an initial variable vector for starting a search for the optimal arrangement of the plurality of microphones 11 by using the JADE method (step S3). For example, the arrangement search device sets a vector including, as a variable, the number of concentric circles in which the microphones 11 are arranged, the radius of each concentric circle, and the number of microphones 11 in each concentric circle to the initial variable vector.

Subsequently, the arrangement search device calculates an objective function value (i.e., an initial objective function value) when the determined initial variable vector is used (step S4), and temporarily stores the calculated objective function value as a reference function value in association with the initial variable vector (step S5). The objective function value is a value indicating an error between an ideal value of the directional characteristics of the microphone array 1 and the directional characteristics of the microphone array 1 calculated using the initial variable vector. The smaller the objective function value, the better the directional characteristics.

Next, the arrangement search device determines an updated variable vector (step S6). The updated variable vector is a variable vector in which at least one variable included in the initial variable vector is changed. The arrangement search device determines the updated variable vector by setting at least one of (i) the number of concentric circles in which the microphones 11 are arranged, (ii) the radius of each concentric circle, and (ii) the number of microphones 11 in each concentric circle to a value different from the initial variable vector. The arrangement search device uses, for example, the differential evolution algorithm in determining the updated variable vector.

The arrangement search device uses a variable vector including, for example, the number of microphones 11 included in each of the plurality of concentric circles and the radius of each of the plurality of concentric circles, as the updated variable vector which is a mutant vector used in the differential evolution algorithm. The arrangement search device selects, from among a plurality of combinations of (i) the number of microphones 11 included in each of the plurality of concentric circles and (ii) the radius of each of the plurality of concentric circles, a combination indicating directional characteristics with the smallest difference from the target value of the directional characteristics, where the plurality of combinations satisfy the constraint conditions.

Specifically, the arrangement search device first calculates the objective function value when the updated variable vector is used (step S7). The arrangement search device compares the calculated objective function value with the objective function value stored in step S5 (step S8). When the calculated objective function value is equal to or greater than the stored reference function value (YES in step S8), the arrangement search device advances the arrangement determination process to step S10. When the calculated objective function value is less than the stored objective function value (NO in step S8), the arrangement search device stores the calculated objective function value (i.e., the updated objective function value) as a new reference function value in association with the updated variable vector (step S9).

Next, the arrangement search device determines whether or not the objective function value has been calculated a predetermined number of times (step S10). That is, the arrangement search device determines whether or not the objective function value has been calculated for a predetermined number of variable vectors. The predetermined number of times is, for example, a number set by a designer of the microphone array 1. When the object function value has been calculated the predetermined number of times (YES in step S10), the arrangement search device determines the arrangement indicated by the variable vector stored in association with the reference function value as the arrangement of the plurality of microphones 11, and ends the process.

If the number of times that the calculation of the objective function value has been performed has not reached the predetermined number of times (NO in step S10), the arrangement search device returns the arrangement determination process to step S6. By executing a selection step of steps S7 to S10 in this manner, the arrangement search device selects, from among a plurality of combinations of positions of the microphones 11, an optimal combination indicating the directional characteristics with the smallest difference from the target value of the directional characteristics, where the plurality of combinations satisfy the constraint conditions (step S11). That is, the arrangement search device selects, from among the initial objective function value and a plurality of updated objective function values, a combination of positions of the plurality of microphones 11 corresponding to the minimum objective function value.

[Search Example for an Optimal Arrangement Using the JADE Method]

Hereinafter, an example that shows searching for an optimal arrangement of the plurality of microphones 11 using the JADE method is described. The following designing process is performed by executing the programs with the arrangement search device, which executes the flowchart of FIG. 4. In the JADE method, an algorithm with enhanced global searchability of the DE method is used to automatically adjust parameters for each problem. Therefore, even for a problem in which a multimodal objective function exists, such as when determining the arrangement of the plurality of microphones 11, the arrangement search device can realize a good search by using the JADE method.

Figure 5:
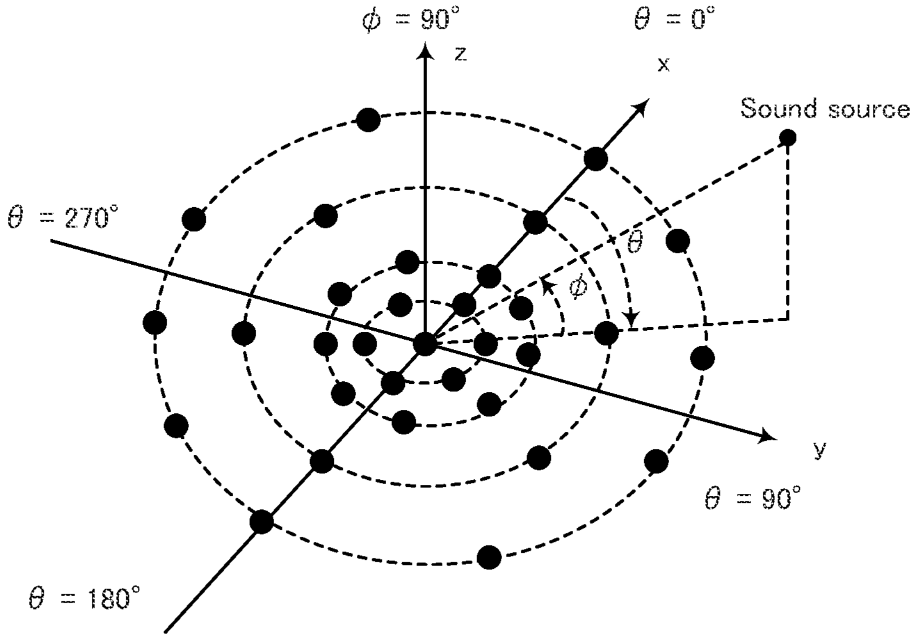
FIG. 5 shows a model used in the present search example.

FIG. 5 shows a model used in the present search example. As shown in FIG. 5, in a space where a position is defined by an x-axis, a y-axis, and a z-axis, a sound source, which is a premise of searching for the optimal arrangement of the plurality of microphones 11, is at an angle of θ from the x-axis in an xy-plane and at an angle of Φ from the xy-plane to the z-axis. That is, the arrangement search device searches for the arrangement of the plurality of microphones 11 whose directivity becomes optimal when the microphone array 1 receives a sound from the sound source oriented in (θ, Φ) with respect to the origin.

It is supposed that a total number of concentric circles is P, the radius of each concentric circle is $r_p$, and the number of microphones 11 arranged in each concentric circle is $M_p$ (p=1, 2, . . . , P). If a distance between a sound source and the microphone array 1 is sufficiently large with respect to the radius $r_P$ of the largest concentric circle, a sound signal generated by the sound source is considered to be a plane wave in the vicinity of the microphone array 1. In this case, a sound receiving signal $z_{pm}(n)$ of the m-th microphone 11 on a certain concentric circle p can be expressed by the following equations using an arrival time difference $\tau_{pm}(\theta, \Phi)$ based on a sound receiving signal $z_{p,xaxis}(n)$ of the microphones 11 on the x-axis of each concentric circle.

$$z_{pm}(n) = z_{p,x_{axis}}(n - m\tau_{pm}(\theta, \phi)) \quad \text{[Equation 1]}$$

$$\tau_{pm}(\theta, \phi) = -\frac{r_p}{c}\cos\phi\cos(\theta - \zeta_{pm}) \quad \text{[Equation 2]}$$

$$\zeta_{pm} = \frac{2\pi m}{M_p} \quad \text{[Equation 3]}$$

Here, c is the speed of sound. In this case, a directivity G(θ, Φ, $\omega_k$) corresponding to the size of the main lobe of the microphone array 1 can be expressed by the following equation.

$$G(\theta, \phi, \omega_k) = \sum_{p=1}^{P}\sum_{m=1}^{M_p} w^*_{pm,k} e^{-j\omega_k\tau_{pm}(\theta,\phi)} \quad \text{[Equation 4]}$$

A weight coefficient $w^*_{pm,k}$ of a delay-sum beamformer can be expressed by the following equation.

$$w^*_{pm,k} = \left(\sum_{p=1}^{P} M_p\right)^{-1} e^{j\omega_k\tau_{pm}(\theta,\phi)} \quad \text{[Equation 5]}$$

A design problem relevant to the optimal arrangement of the plurality of microphones 11 can be replaced by a problem of searching for the arrangement of the microphones 11 which can obtain a directivity G(θ, Φ, $\omega_k$), which is close to a desired directivity D(θ, Φ, $\omega_k$), serving as the target value. The error E(θ, Φ, $\omega_k$) used in the search can be expressed by the following equation.

$$E(\theta,\phi,\omega_k)=|D(\theta,\phi,\omega_k)-G(\theta,\phi,\omega_k)| \quad \text{[Equation 6]}$$

The optimal placement can be specified by obtaining a variable vector that minimizes the maximum error in an approximate band, as shown in the following equation.

$$\min_{M_p, r_p} \max_{\substack{\theta\in\Theta \\ \phi\in\Phi \\ \omega_k\in\Omega}} E(\theta, \phi, \omega_k) \quad \text{[Equation 7]}$$

Here, in order to obtain the variable vector that minimizes the maximum error by using the JADE method, the arrangement search device first initializes N solution populations $X_i$ (i=1, 2, . . . , N) using a uniform random number for within a domain range of a search space, and calculates the objective function value of each individual. The arrangement search device generates differential mutant individuals, child individuals, and evolution individuals up to the maximum generation number I, and searches for the minimal solution of the objective function.

In order to apply the JADE method to a microphone arrangement design problem, a variable vector x is defined as follows:

$$x=[M_1, \ldots, M_P, r_1, \ldots, r_P] \quad \text{[Equation 8]}$$

Here, to make sure that the arrangement will not be determined to be an arrangement that is impossible to realize, the constraint conditions for keeping the number of microphones 11 within the maximum number $M_{max}$ that can be realized are defined as follows:

$$\sum_{p=1}^{P} M_p \le M_{max} \quad \text{[Equation 9]}$$

In the microphone system S, a sound source localization process is performed prior to the beamforming process. Therefore, when determining the arrangement of the plurality of microphones 11, an arrangement of the sound source localization microphones 11 must also be considered. To arrange one concentric circle at the central position of the concentric circles and three or six sound source localization microphones 11 in the innermost concentric circle C1, as shown in FIG. 2, the following constraint conditions are added:

$$M_1=1, M_2=\{3,6\}, M_{p'}\notin v, v=\{1,2\}, p'=\{w\in \mathbb{N} \mid w=[3,P]\} \quad \text{[Equation 10]}$$

When the maximum radius of the outermost concentric circle is $R_{max}$, the constraint conditions on the radius $r_p$ of each concentric circle are as follows:

$$r_1=0, r_P=R_{max}, r_{p-1}<r_p \quad \text{[Equation 11]}$$

In this case, a variable vector x' to be obtained is expressed as follows:

$$x'=[1, M_2, \ldots, M_P, 0, 72, r_2, \ldots, r_{p-1}, R_{max}]^T \quad \text{[Equation 12]}$$

Therefore, the design problem of arranging the plurality of microphones 11 is formulated as a mixed integer programming problem, as shown below:

$$\min\ \delta, sub.to E(\theta_s,\phi_s,\omega_k)\le\delta \quad \text{[Equation 13]}$$

$$\sum_{p=1}^{P} M_p \le M_{max},\ r_{p-1} < r_p,\ M_2 = \{3, 6\},\ M'_p \notin v,\ v = \{1, 2\} \quad \text{[Equation 14]}$$

$$M'_p \notin v,\ v = \{1, 2\},\ p' = \{w \in \mathbb{N} | w = [3, P]\},\ M_p \in \mathbb{N},\ r_p \in \mathbb{R} \quad \text{[Equation 15]}$$

Here, $\theta_s$ and $\Phi_s$ (s=1, . . . , S) represent discrete directions, and δ represents the maximum error in the approximate band in Equation 6. In the search for the optimal arrangement by the JADE method, the following magnification objective function f(x') using this δ is used.

$$f(x') = \delta + \sum_{u=1}^{4} \lambda_u(x') \quad \text{[Equation 16]}$$

Here, $\lambda_u$(x') (u=1, . . . , 4) represents a penalty function. $\lambda_1$(x') is a penalty function for limiting the maximum number of microphones 11.

$$\lambda_1(x') = \begin{cases} 0, & M_{sum} \le M_{max} \\ |M_{sum} - M_{max}|^2, & \text{otherwise} \end{cases} \quad \text{[Equation 17]}$$

$$M_{sum} = \sum_{p=1}^{P} M_p \quad \text{[Equation 18]}$$

The $\lambda_2$(x') is a penalty function for the number of sound source localization microphones 11.

$$\lambda_2(x') = \begin{cases} 0, & M_2 = \{3, 6\} \\ \dfrac{|M_2 - 3|^2 |M_2 - 6|^2}{|M_2 - 3|^2 + |M_2 - 6|^2}, & \text{otherwise} \end{cases} \quad \text{[Equation 19]}$$

$\lambda_3(x')$ is a penalty function for preventing the number of microphones 11 arranged in each concentric circle from being 2 or less.

$$\lambda_3(x') = \begin{cases} 0, & M'_p \notin v, \forall p' \\ 1, & \text{otherwise} \end{cases} \quad \text{[Equation 20]}$$

$\lambda_4(x')$ is a penalty function for arranging the radii in ascending order. $\alpha>0$ is a constant for preventing the difference between the radii of the adjacent concentric circles from being 0.

$$\lambda_4(x') = \begin{cases} 0, & r_{p-1} < r_p - \alpha, \forall p \\ |1 + r_{p-1} - (r_p - \alpha)|^2, & \text{otherwise} \end{cases} \quad \text{[Equation 21]}$$

[First Search Example]

In the present search example, $\Phi_L$=0[rad], for simplicity. A desired directivity $D(\theta, \omega_k)$ is set as shown in the following equation.

$$\begin{cases} D(\theta_L, \omega_k) = 1 \\ D(\theta_s, \omega_k) = 0, \theta_s \in \Theta_s \\ \Theta_s = \Theta_{s1} \cup \Theta_{s2} \\ \Theta_{s1} = [-\pi, \theta_{s1}] \\ \Theta_{s2} = [\theta_{s2}, \pi] \end{cases} \quad \text{[Equation 22]}$$

Here, $\theta_{S1}$ and $\theta_{S2}$ are the directions of the borders of the main lobe. In the present search example, $\theta_{S1}=-\pi/3$[rad], $\theta_{S2}=\pi/3$[rad], a sound source direction $\theta_L$=0[rad], and the sound speed c=343 [m/s]. In the JADE method, the initial values of $\mu_F$ and $\mu_{CR}$ are 0.5, and $P_{best}$ is 0.05.

As a result of determining the arrangement of the plurality of microphones 11 with the JADE method using a computer as the arrangement search device under the above conditions, the microphone array 1 shown in FIG. 2 was designed. In the microphone array 1, the radius of each concentric circle and the number of microphones 11 in each concentric circle are shown in Table 1.

TABLE 1

| Radius [m] | Number of microphones |
|---|---|
| 0 | 1 |
| 0.03856 | 3 |
| 0.10660 | 4 |
| 0.14024 | 7 |
| 0.21500 | 17 |

Figure 6:
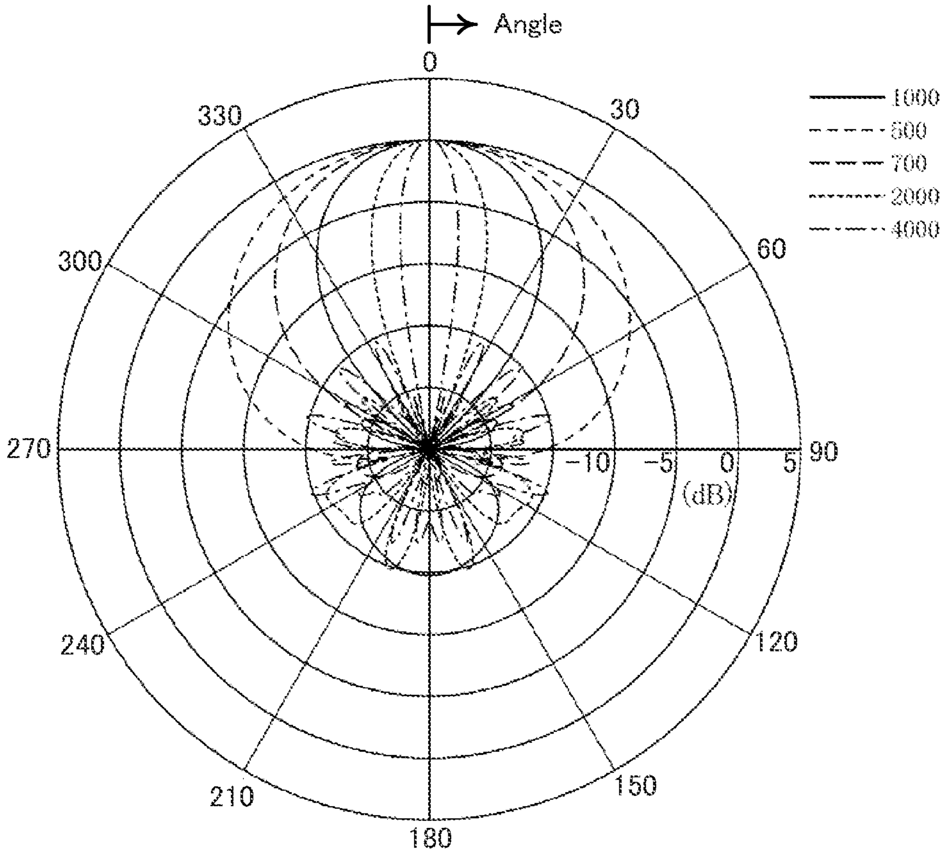
FIG. 6 shows directional characteristics of the microphone array of a first search example.

FIG. 6 shows directional characteristics of the microphone array 1 (i.e., the microphone array 1 shown in FIG. 2) of a first search example. FIG. 6 shows the directional characteristics for a sound of each frequency: 500 Hz, 700 Hz, 1000 Hz, 2000 Hz, and 4000 Hz. In FIG. 6, the maximum value of the main lobe is indicated as 0 dB.

Figure 7:
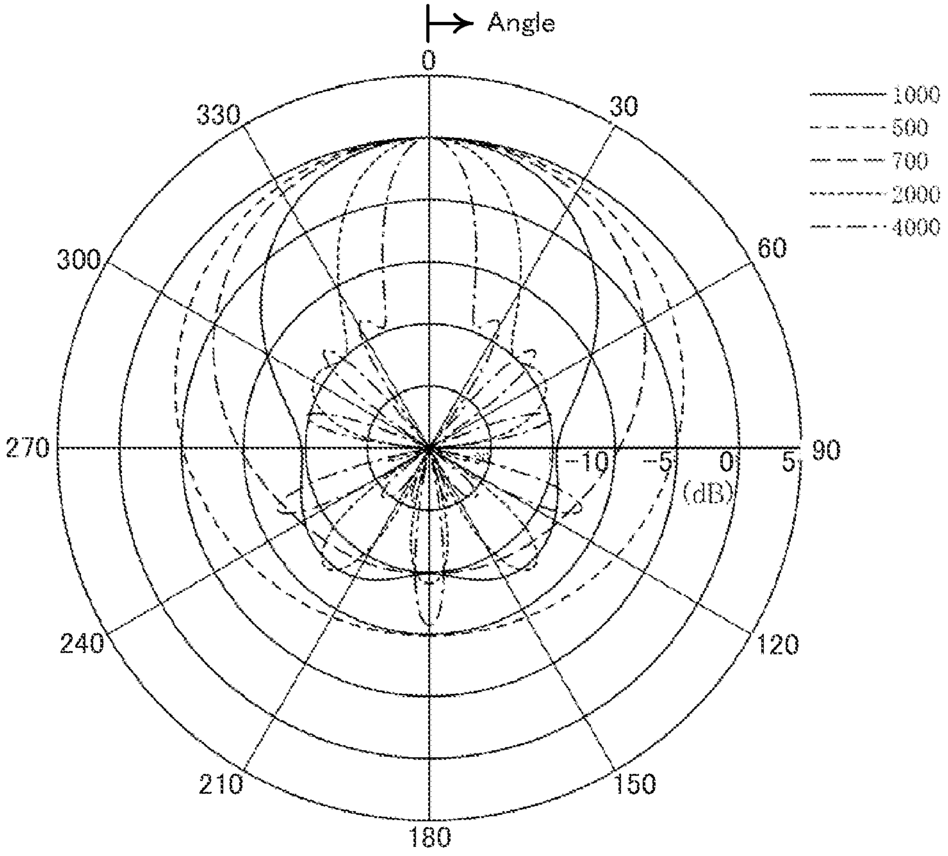
FIG. 7 shows directional characteristics of the microphone array of a comparative example.

As a comparative example, the radius of each concentric circle and the number of the microphones 11 for each concentric circle of a microphone array, in which the microphones 11 are arranged without using the JADE method, are shown in Table 2. FIG. 7 shows directional characteristics of the microphone array of the comparative example.

TABLE 2

| Radius [m] | Number of microphones |
|---|---|
| 0 | 1 |
| 0.03 | 6 |
| 0.06 | 9 |
| 0.12 | 6 |
| 0.18 | 10 |

By comparing FIG. 6 and FIG. 7, the directional characteristics shown in FIG. 6 are confirmed to have stronger directivity than the directional characteristics shown in FIG. 7. Specifically, in the directional characteristics shown in FIG. 6, the minimum value of the attenuation amount of the side lobe relative to the main lobe is 14.8 dB, whereas in the directional characteristics shown in FIG. 7, the minimum value of the attenuation amount of the side lobe relative to the main lobe is 5 dB. From this, it was confirmed that it is effective to determine the arrangement of the plurality of microphones 11 using the JADE method.

[Second Search Example]

The radius of each concentric circle and the number of microphones 11 in each concentric circle determined using the JADE method under the condition that the number of microphones 11 is 48 and the maximum radius of the concentric circle is 0.215 [m] is shown in Table 3.

TABLE 3

| Radius [m] | Number of microphones |
|---|---|
| 0 | 1 |
| 0.04070 | 3 |
| 0.09592 | 8 |
| 0.17148 | 16 |
| 0.21500 | 20 |

Figure 8:
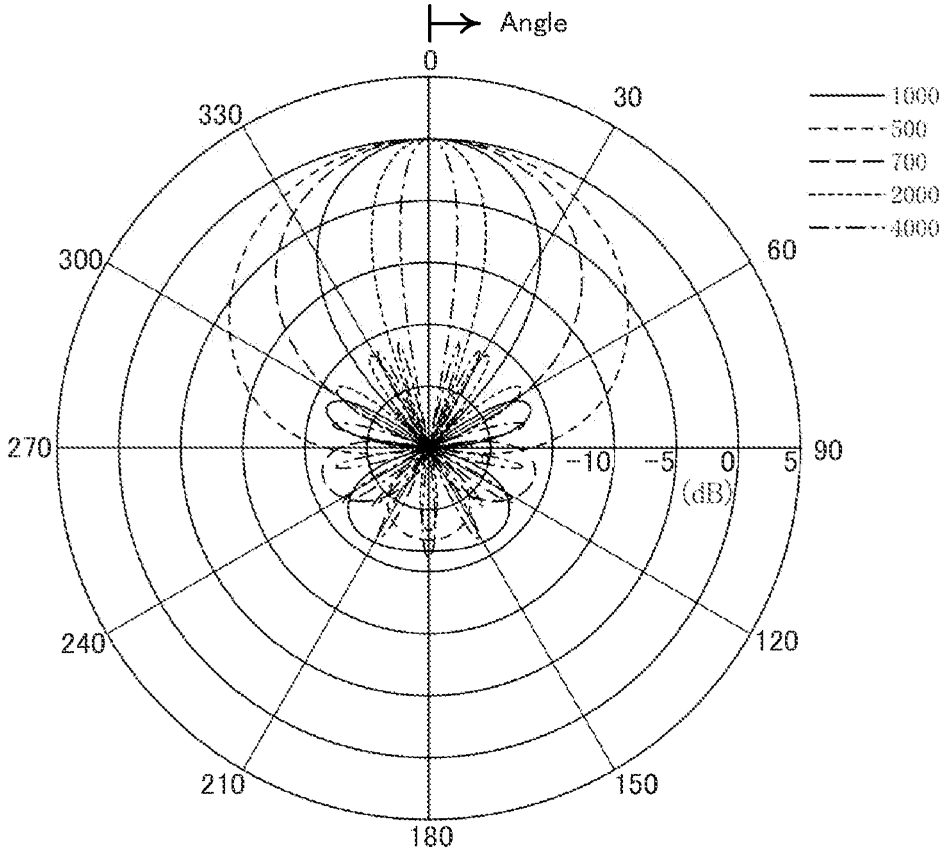
FIG. 8 shows directional characteristics of the microphone array of a second search example.

FIG. 8 shows directional characteristics of the microphone array 1 of a second search example. In the directional characteristics shown in FIG. 8, the minimum value of the attenuation amount of the side lobe relative to the main lobe is 16.1 dB. The directional characteristics shown in FIG. 8 are also confirmed to have stronger directivity than the directional characteristics shown in FIG. 7.

[3rd Search Example]

The radius of each concentric circle and the number of microphones 11 in each concentric circle determined by using the JADE method under the condition that the number of microphones 11 is 64 and the maximum radius of the concentric circle is 0.215 [m] is shown in Table 4.

TABLE 4

| Radius [m] | Number of microphones |
|---|---|
| 0 | 1 |
| 0.04718 | 3 |
| 0.08322 | 5 |
| 0.10001 | 9 |
| 0.15456 | 8 |
| 0.21500 | 38 |

Figure 9:
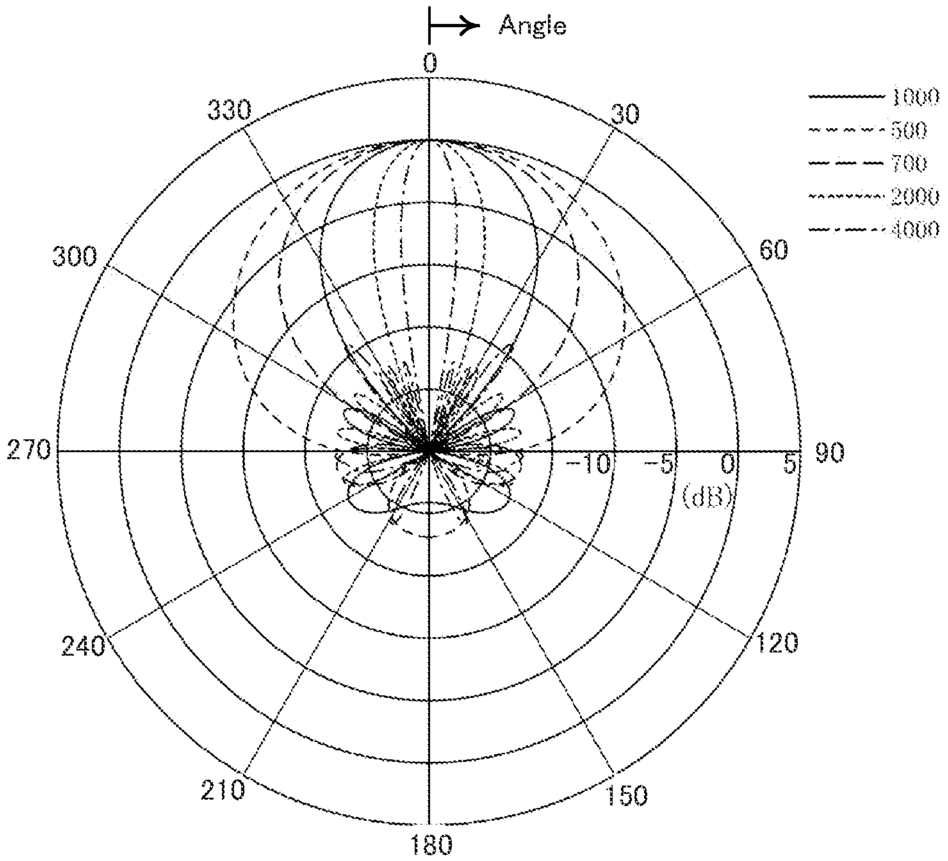
FIG. 9 shows directional characteristics of the microphone array of a third search example.

FIG. 9 shows directional characteristics of the microphone array 1 of a third search example. In the directional characteristics shown in FIG. 9, the minimum value of the attenuation amount of the side lobe relative to the main lobe is 17.4 dB. The directional characteristics shown in FIG. 9 are also confirmed to have stronger directivity than the directional characteristics shown in FIG. 7.

The microphone arrays 1 designed by using the JADE method have the following common features:

(1) The variation amount of the difference between the radii of two concentric circles adjacent to each other among the plurality of concentric circles does not increase monotonically according to the distance from the center position of the plurality of concentric circles; and (2) The attenuation amount of the side lobe relative to the main lobe in the directional characteristics is equal to or greater than 10 dB. When the microphone array 1 has these features, the microphone array 1 preferentially collects the sound generated by the sound source for which the sound should be collected, and makes it difficult to collect unnecessary sounds.

[Variation Example]

An example where three sound source localization microphones 11 are arranged at uniform intervals on the innermost concentric circle C1 has been shown above, but six sound source localization microphones 11 may be arranged at uniform intervals on the innermost concentric circle C1.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A method for determining positions of a plurality of microphones in a microphone array having the plurality of microphones, wherein the plurality of microphones includes a plurality of localization microphones used for specifying a direction of a sound source and a plurality of microphones other than the plurality of localization microphone, wherein the plurality of microphones are arranged in a plurality of concentric circles, the method comprising:

displaying a screen for inputting constraint conditions for determining the positions of the plurality of microphones;

acquiring constraint conditions input on the screen, the constraint conditions comprising (i) a maximum number of the plurality of microphones and (ii) a condition that the number of the plurality of localization microphones is equal to or more than three and at least three of the plurality of localization microphones are arranged at triangle vertices on one of the plurality of concentric circles; and selecting from among a plurality of combinations of (i) the number of microphones included in each of the plurality of concentric circles and (ii) the radius of each of the plurality of concentric circles, a combination indicating directional characteristics with the smallest difference from a target value of the directional characteristics of the microphone array, where the plurality of combinations satisfy the constraint conditions, wherein the selecting step includes:

setting a vector including, as variables, the number of the plurality of concentric circles in which the plurality of microphones are arranged, the radius of each of the plurality of concentric circles, and the number of the microphones arranged in each of the plurality of concentric circles to an initial variable vector;

calculating an initial objective function value which is a value indicating an error between an ideal value of the directional characteristics of the microphone array and the directional characteristics of the microphone array calculated using the initial variable vector;

determining a plurality of updated variable vectors different from the initial variable vector;

calculating a plurality of update objective function values, which are values indicating an error between the ideal value of the directional characteristics of the microphone array and the directional characteristics of the microphone array calculated using the plurality of updated variable vectors; and selecting, from among the initial objective function value and the plurality of update objective function values, a combination of positions of the plurality of microphones corresponding to a minimum objective function value.

2. The method for determining microphone position according to claim 1, wherein the acquiring step includes acquiring a constraint condition that a number of a plurality of sound source localization microphones used for specifying a direction of a sound source.

3. The method for determining microphone position according to claim 1, wherein the acquiring step includes acquiring a constraint condition that a radius of an outermost concentric circle of the plurality of concentric circles.

4. The method for determining microphone position according to claim 1, wherein the acquiring step includes acquiring a constraint condition that a number of microphones included in each of the plurality of concentric circles being three or more.

5. The method for determining microphone position according to claim 1, wherein the acquiring step includes acquiring a constraint condition that a target value of the directional characteristics corresponding to a difference between the magnitude of a main lobe and the magnitude of a side lobe of the sensitivity to input sound signals.

6. The method for determining microphone position according to claim 1, wherein the acquiring step acquires a constraint condition that one of the plurality of localization microphones is arranged inside the three of the plurality of localization microphones arranged at the triangle vertices on one of the plurality of concentric circles.

* * * * *